Feb. 24, 1925.   1,527,570
W. P. MORPHEW
COTTON SEED DISTRIBUTOR
Filed March 22, 1924
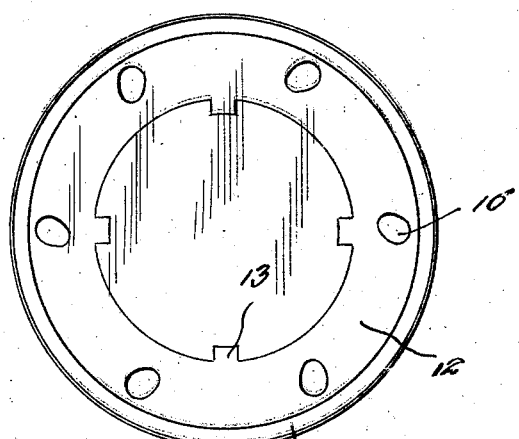
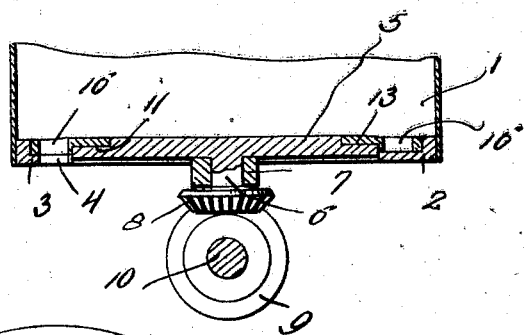
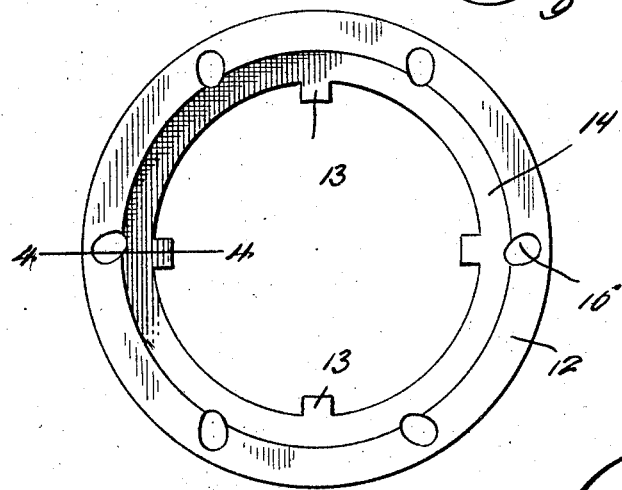
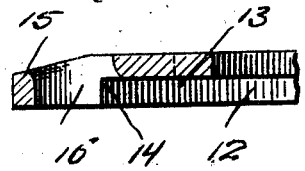
Inventor
W. P. Morphew.
By
Attorney Patented Feb. 24, 1925.

1,527,570

UNITED STATES PATENT OFFICE.

WILLIAM P. MORPHEW, OF ROXTON, TEXAS.

COTTONSEED DISTRIBUTOR.

Application filed March 22, 1924. Serial No. 701,185.

*To all whom it may concern:*

Be it known that I, WILLIAM P. MORPHEW, a citizen of the United States, residing at Roxton, in the county of Lamar and State of Texas, have invented certain new and useful Improvements in Cottonseed Distributors, of which the following is a specification.

This invention relates to new and useful improvements in cotton seed distributors which are more particularly adapted to be used upon cotton seed planters and has for its principal object to provide a simple and efficient means whereby the cotton seeds will be distributed at predetermined intervals.

A further object of the invention is to provide a cotton seed distributor of the above mentioned character, wherein the seeds will be planted at predetermined intervals thereby obviating the necessity of having to do any chopping or thinning afterwards.

A still further object of the invention is to provide a cotton seed distributor of the above mentioned character, wherein the cotton seed hopper and the discharge opening provided therein and a distributing ring rotatably supported in the hopper and operated in such a manner as to have the openings in the ring brought into registry with the opening in the hopper successively and periodically, whereby the seeds in the hopper may be discharged through the registering openings.

A still further object of the invention is to provide a cotton seed distributor of the above mentioned character, which is simple in construction, inexpensive, strong and durable, and further well adapted for the purposes for which it is designed.

Other objects and advantages of this invention will become apparent during the course of the following description.

In the accompanying drawing forming a part of this specification, and in which like numerals designate like parts throughout the same, Figure 1 is a top plan view showing my seed distributing ring in position within a hopper, Figure 2 is a central vertical section through the hopper with my distributing ring in position thereon and the actuating means therefor associated therewith, Figure 3 is a bottom plan view of the distributor ring, and Figure 4 is a sectional view taken on line 4—4 of Figure 3.

In the drawing wherein for the purpose of illustration is shown the preferred embodiment of my invention, the numeral 1 designates a hopper which is of the well known construction and in which is adapted to be deposited the cotton seeds which are to be planted. The hopper in the present instance is open at its bottom and adapted to be supported therein is the annular flange 2. The annular flange 2 has the horizontal portion 3 extending from the bottom thereof in the manner as clearly shown in Figure 2 of the drawing. Provided in the horizontal portion of the annular flange 2 is the discharge openings 4, the purpose of which will be presently apparent.

Supported in the bottom of the hopper 1 and disposed within the inner diameter of the horizontally extending portion 3 of the flange 2 is the disc 5. The disc 5 has the stub shaft 6 extending from the bottom thereof through a suitable bracket 7 carried by the bottom of the hopper 1 and mounted on the outer end of the stub shaft 6 is the bevelled gear 8 which is adapted to mesh with a similar gear 9 keyed to the drive shaft 10, the latter being driven at predetermined intervals by the seed dropping actuating mechanism provided on the planter, not shown, and as the same is of the well known construction, it is not thought necessary to either show or describe the same.

The upper face of the disk 5 which is rotatably supported within the annular flange 2, has a plurality of notches, such as are shown at 11 in the drawing provided adjacent the peripheral edge thereof and the purpose of this construction is to provide a means for supporting the distributor ring designated generally by the numeral 12.

The distributor ring 12 has the projections 13 extending inwardly therefrom for cooperation with the notches 11 whereby the ring may be supported on the disc 5 so that the body portion of the ring will extend beyond or around the peripheral edge of the disc in the manner as clearly shown in Figure 2 of the drawing. It is to be also understood that the inner portion of the distributor ring 12 is cut away as is shown at 14 in the drawing, to provide a means whereby the ring may properly encircle the disc 5 so that the upper face of the disc will be flush with the upper face of the inner portion of the distributor ring. The outer portion of the upper face of the distributor ring is bevelled as is shown at 15 in the drawing so as to cooperate with the upper face of the annular flange 2.

Arranged in the outer portion of the distributor ring 12 at predetermined spaced intervals, are the openings 16. As many openings are provided as is necessary and I do not wish to limit myself to the particular number of openings which are to be provided in the distributor ring. The openings are further so arranged in the distributor ring so as to register with the discharge openings 4 provided in the horizontal portion 3 of the annular flange 2 and the openings are brought into registry with the discharge opening successively and periodically for discharging the seeds in the hopper through the registering openings into the soil where the same are planted.

In operation, it is to be understood that when the disc 5 is rotated, the distributor ring carried thereby will also rotate and the outer portion thereof will travel over the upper surface of the horizontal portion 3 of the annular flange so that the openings in the ring may be brought into registry with the discharge opening provided in the flange. It is to be also understood that the openings 16 are of such shape as to conform to the shape of the seeds which are adapted to pass therethrough, although it is to be understood that the openings may be of any suitable formation as is desirable.

The simplicity of my device enables the same to be easily and readily placed in position upon a cotton seed planter, and when in operation will efficiently permit the seeds to be planted in the soil in such a manner as to obviate the necessity of chopping or thinning as frequently results with the cotton seed distributors now in use upon the cotton seed planters. Furthermore the parts are so constructed as to enable the same to be readily disassembled whenever necessary and there will be no possibility of any of the seeds in the hopper from turning the proper operation of the distributor ring. The distributor ring may be constructed of any suitable material and I do not wish to limit myself to the particular kind to be used.

A device of the above mentioned character, will not only be strong and durable, but can also be manufactured at a very low cost.

While I have shown the preferred embodiment of my invention, it is to be understood that various changes in the size, shape and arrangement of parts may be resorted to without departing from the spirit of the invention and the scope of the appended claim.

Having thus described my invention, what I claim is:

A planter hopper, a flange inserted in the lower end thereof and provided at its upper side and at its inner edge with an annular recess, a disk journaled for rotation upon an axis positioned centrally of the flange, said disk having its upper surface lying in the same plane as the plane in which the upper surface of the flange lies, the disk being provided at its upper side and at its edge with an annular recess, a ring having its inner portion seated in the last mentioned recess and having its upper surface lying in the same plane as that in which the upper surface of the disk lies, said ring having an outer thickened portion which lies in the recess of the flange, the ring being provided at intervals with openings passing transversely through the outer thickened portions thereof.

In testimony whereof I affix my signature.

WILLIAM P. MORPHEW.